Dec. 22, 1953

F. L. MOSELEY 2,663,520

GLIDE PATH CONTROL SYSTEM

Filed March 3, 1945

INVENTOR.
FRANCIS L. MOSELEY
BY William D. Hall
ATTORNEY

INVENTOR.
FRANCIS L. MOSELEY
BY William D. Hall.
ATTORNEY

Dec. 22, 1953

F. L. MOSELEY 2,663,520

GLIDE PATH CONTROL SYSTEM

Filed March 3, 1945

INVENTOR.
FRANCIS L. MOSELEY

BY William D. Hall.
ATTORNEY

Dec. 22, 1953  F. L. MOSELEY  2,663,520
GLIDE PATH CONTROL SYSTEM
Filed March 3, 1945  4 Sheets-Sheet 4

INVENTOR.
FRANCIS L. MOSELEY
BY William D. Hall
ATTORNEY

Patented Dec. 22, 1953

2,663,520

UNITED STATES PATENT OFFICE 2,663,520

GLIDE PATH CONTROL SYSTEM

Francis L. Moseley, Osborn, Ohio, assignor to Collins Radio Company, Cedar Rapids, Iowa, a corporation of Iowa Application March 3, 1945, Serial No. 580,789

19 Claims. (Cl. 244—77)

(Granted under Title 35, U. S. Code (1952), sec. 266)

The invention described herein may be manufactured and used by or for the Government for governmental purposes, without the payment to me of any royalty thereon.

This invention relates to automatic flight control and more particularly to the automatic landing of aircraft along a glide path, and has relation to my prior co-pending applications Serial Number 378,296, filed February 10, 1941, now Patent No. 2,423,336; Serial Number 505,917, filed October 12, 1943, now Patent No. 2,496,809; Serial Number 542,594, filed June 28, 1944, now Patent No. 2,576,135; and Serial Number 545,173, filed July 15, 1944, now abandoned.

In the above applications, automatic flight control systems for aircraft are disclosed employing a localizer for setting up overlapping field patterns defining an equi-signal plane between such patterns and indicating the course to the runway. These systems also utilize radio transmitters provided with suitable antennas setting up a radiation pattern along a line or plane suitable for employment as a glide path to the landing end of the runway. The descent of the aircraft is controlled by a positional signal obtained from a glide path receiver utilized in connection with a radio transmitter having a radiation pattern providing an equi-signal path along which the aircraft is guided, which varies in amplitude and polarity according to the amount and direction of departure of the aircraft from the glidepath line. Normally, this signal will result in a small direct current voltage which is fed into an elevator control amplifier in opposed relation to a follow-up signal. The amplifier, in turn, feeds means for actuating the gyro system of a suitable automatic pilot to change the action of the elevators and, therefore, the vertical direction of travel of the aircraft. This actuating means also controls the magnitude of the follow-up signal which measures the directional correction through which the aircraft is turned and is proportional to the action of the actuating means. When the magnitude of the follow-up signal reaches that of the positional signal, they balance out and the means for actuating the gyro system comes to rest or ceases to function. In this way, the aircraft is headed automatically into and along a flight path which is coincident with that of the line marking the radio defined glide path.

In flying a glide path beam with the systems disclosed in the above application, it is necessary to set the aircraft initially so that it is descending along a path parallel to the radio-defined glide path prior to switching on the automatic control. The action of the automatic control will then be to bring the aircraft on to the glide path. When the aircraft reaches the glide path line, it will have turned back to its original attitude, and if this original attitude were not precisely correct to maintain a flight path coincident with the glide path, the aircraft would then fly off the glide path line until a restoring signal was encountered having a value sufficiently great to change the flight of the aircraft back towards the glide path the required amount. A balance would thus be established and the aircraft would fly in towards the station along a line which would converge upon but would not be coincident with the glide path.

Now, if the attitude of the aircraft is at an angle away from the glide path as distinguished from being parallel with or at an angle to the glide path line, the correction interposed by the positioning signal could never be sufficient to bring the aircraft on to the course. The greater the angle of attitude away from the glide path line, the further the aircraft will deviate from the true glide path line. The correction interposed by the positioning signal is proportional to its differential strength and this, in turn, is proportional to the distance of the aircraft away from the glide path line on either side thereof. It has no necessary relation to pitch or vertical angle of heading. However, the reference line selected was a line parallel to the glide path line. If this had not been the case and the vertical heading of the aircraft were away from the glide path, the positional signal, which overcomes the follow-up signal would not be sufficiently great to return the aircraft to the flight path. On the other hand, if the plane is headed towards the glide path, the positional signal will decrease as the aircraft approaches the glide path and the follow-up signal will balance it out, so that the plane will reach and cross the glide path line.

The effects of winds which vary from strata to strata at different heights may force the aircraft to fly lines converging on the glide path, but far enough displaced from it to cause the aircraft to obtain sufficient departure signal to head back towards the glide path line, finally reaching a balanced condition of flight along a line convergent with the radio-defined glide path. The aircraft then proceeds down this line and reaches the station but may fail to descend upon the landing end of the runway.

Applicant, with the knowledge of the effects of wind, initial incorrect vertical heading, and gyro drift, causing the aircraft to seek and fly a line which is not coincident with the glide path line, has for an object of his invention the provision of a system for automatically controlling the vertical flight of aircraft which corrects for the above factors and which will cause the aircraft to fly the glide path line or beam.

Applicant has as another object of his invention the provision of a system responsive to any off glide path position of an aircraft for inserting into the controls a slow correction towards the glide path, which correction is continuously inserted until the aircraft reaches the glide path line.

Applicant has as another object of his invention, the provision of a system responsive to an off glide path position of an aircraft for interposing a correction to return the aircraft back to the glide path line and establish a rate of descent which will cause the aircraft to fly in the direction which is sufficient to maintain itself on the glide path and compensate for the effects of winds and/or other factors tending to move it off the glide path.

Applicant has as a further object of his invention, the provision of a system for automatically steering the aircraft on to a glide path coincident with a predetermined glide path line defined by positional radio signals, and taking into account the effects of winds, initial off glide path setting and gyro drift.

Applicant has as a still further object of his invention the provision of a system for automatically maintaining an aircraft on a glide path preferably through controlling settings of its throttle controls during descent so that its flight path may be coincident with a predetermined glide path defined by positional radio signals taking into account the effects of winds and other changing factors.

Other objects and advantages of his invention will appear from the following specification and accompanying drawings and the novel features thereof will be particularly pointed out in the annexed claims.

Figure 1:
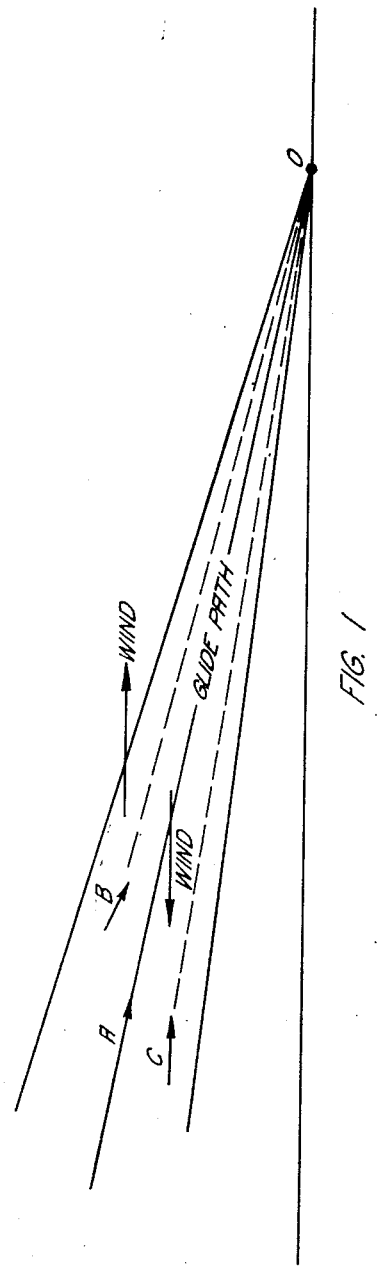
Fig. 1 illustrates the flight paths of aircraft in descent under different conditions, and operating under the control of known automatic flight equipment.

Referring to the drawings in detail, in Fig. 1, an aircraft is shown at A, on the glide path with correct trim and power settings for descent along this path in a condition of zero wind. At B is shown an aircraft under automatic control on the glide path with the same power and trim settings as the aircraft at A, the difference in the case of B being that a strong following wind is present. An aircraft is shown at C wherein conditions are as described for the aircraft at B except that the aircraft C is flying into a head wind.

It will be observed that approach into a head wind necessitates a greater ratio of air speed to rate of descent, whereas flight assisted by a tail wind requires a decrease of air speed or an increase in rate of descent.

The aircraft at C is below the correct path and in response to departure signal received from the glide path has changed its attitude upward and has assumed an approximately level flight condition. It is evident that the aircraft at C has reached a balanced condition and will fly down the line CO rather than the correct glide path line AO. The aircraft at B is above the glide path and has changed attitude to head downward toward the glide path but is being carried forward too rapidly by the wind to permit it ever to reach the correct glide path line. This aircraft will then follow the line BO.

In order to take care of the conditions described relating to airplanes as illustrated by those at B and C, it is proposed to provide auxiliary apparatus which will take account of the fact that an airplane in the presence of an aiding or opposing wind will ride continuously above or below the glide path and utilize such information to slowly decrease or increase the throttle setting in order to change the ratio between air speed and rate of descent. This auxiliary apparatus will cease to function when the airplane is on the correct glide path.

Figure 2:
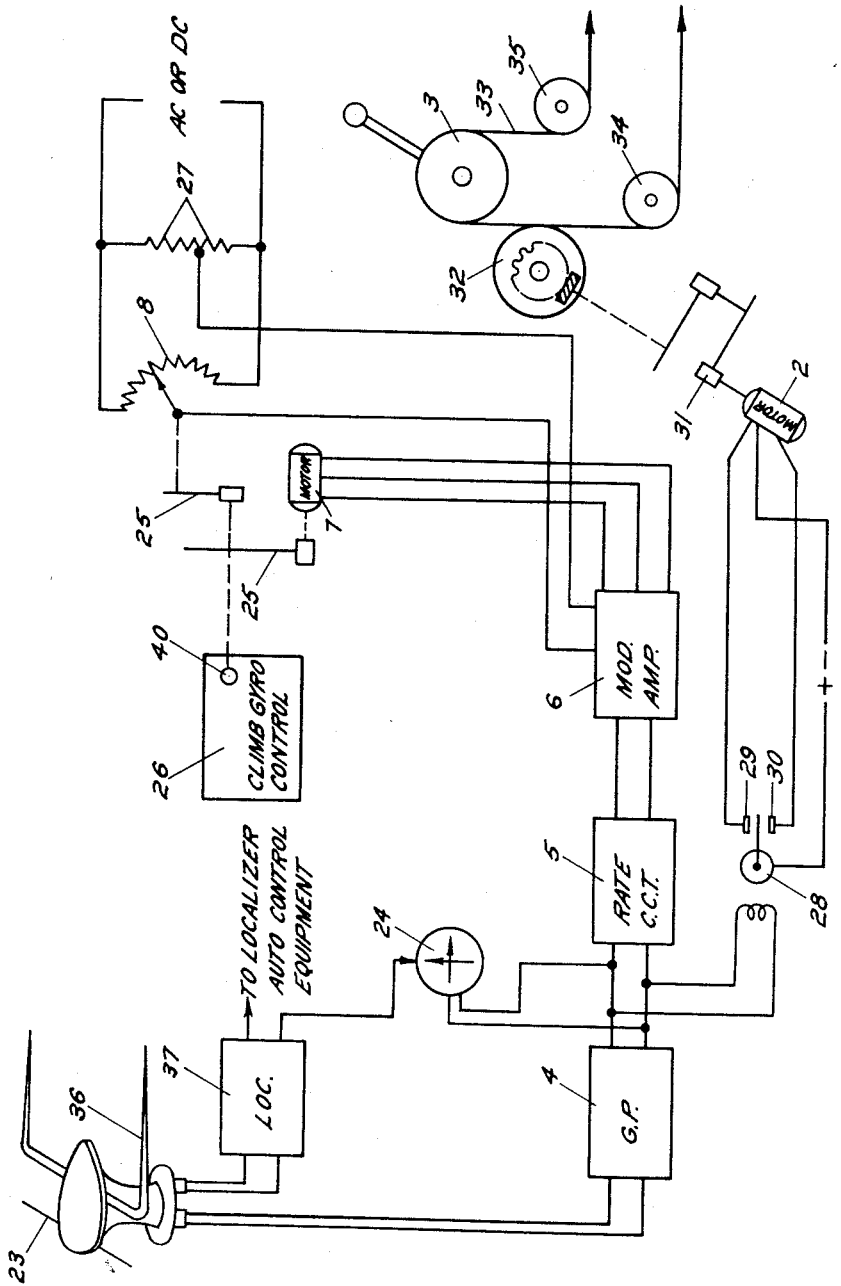
Fig. 2 is a schematic circuit diagram of one form of applicant's improved control circuit.

Referring to Fig. 2, a glide path receiver is shown at 4 and is provided with an antenna 23 for receiving the doubly modulated fields or patterns previously referred to.

This receiver is well known in the art being customarily utilized to operate the horizontal needle of a cross-pointer instrument 24 for the purpose of giving the pilot a visual indication of his position relative to the glide path, and is described in my prior co-pending applications cited above. In general, however, the receiver circuits differentiate between the two sides of the glide path beam. The R. F. signal is received on antenna 23 and is fed to the glide path receiver 4 where normal amplification and detection takes place. After detection, the 90 and 150 cycle modulation components where these frequencies are employed, are selectively filtered and differentially rectified to produce the D. C. signal which varies in strength and polarity according to the distance the aircraft is from the glide path and whether it is above or below it. The output of the glide path receiver 4 is employed to control the operation of reversible climb control motor 7. This motor controls the pitch of the aircraft in a manner proportional to the departure of the aircraft from the glide path line or beam. To obtain the desired actuation of the elevators under control of motor 7, use is made of the automatic pilot provided in the aircraft. The gyroscopic automatic pilot of the type described in Patent Number 1,992,970, dated March 5, 1935, is well adapted to such purpose, although the invention is not limited to use with that particular type of automatic pilot. The type of automatic pilot is well described in my first two co-pending applications cited above.

As shown in Fig. 2, motor 7 is provided with reduction gearing 25 and operatively connected with the elevator control or climb gyro 26 through knob 49 of the automatic pilot which, in turn, controls the movement or operation of the elevators. In order to obtain the requisite power for operating motor 7, and in order to obviate the necessity for additional power equipment, and to utilize that of the automatic pilot, a modulator amplifier which is described in detail in my co-pending application Serial Number 545,173 filed July 15, 1944, is provided to take A. C. power from the auto pilot equipment, and pass it through a ring modulator controlled as to polarity and balance by the D. C. energy from the glide path receiver 4. The resulting A. C. is amplified, fed into and serves to operate the motor 7 in either direction of its rotation according to the polarity of the D. C. or glide path receiver 4. Also to insure pitch correction proportional to the departure of the aircraft, it is necessary to proportion the operation of the control motor to the differential amplitude of the positional signal from the glide path receiver. In this arrangement, the positional signal is opposed by a follow-up signal, which measures the pitch correction through which the aircraft is moved under operation of motor 7. For this purpose it is convenient to employ a potentiometer 8 in the circuit shown with A. C. or D. C. source from the auto-pilot or otherwise, and center tapped resistance 27 to form a bridge. As shown, the arm or slide of the potentiometer 8 is operatively connected to turn motor 7 and functions to supply the modulator amplifier 6 with a voltage proportional to the pitch correction bucking the positional signal from the glide path receiver 4. This is done by upsetting the balance of the bridge. Under control of this circuit, motor 7 operates to change the pitch of the aircraft only until the follow-up bucking voltage becomes equal and opposite to the positional signal, and thereby effects a pitch correction proportional to the departure from a line parallel to the glide path, as described in my co-pending applications cited above.

Interposed between the glide path receiver 4 and modulator amplifier 6 is a rate circuit 5 which measures the rate of change of departure from or approach to the glide path line, and introduces a correction to overcome hunting of the aircraft about the glide path line, and to reduce overshooting of the glide path, as described in my co-pending applications cited above.

Connected across the cross-pointer instrument 24 in the output of the glide path receiver 4, is the winding of a polarized relay 28 which includes a pointer that moves against contacts on either side thereof in response to currents which actuate the horizontal needle of cross-pointer instrument 24 on one side or the other of the horizontal, so that when such currents move the horizontal needle to one side or the other of the horizontal, the pointer of the relay 28 likewise moves against one or the other of contacts 29, 30 depending upon the direction of current flow in the relay winding. This relay serves to close circuit leading to the reversible motor 2. The motor 2 acts through gear train 31 to drive pulley 32 and move flexible belt 33, passing over pulleys 34, 35, to actuate the throttle of the aircraft, through pulley 3. This controls the speed and power delivered by the aircraft engines. The gearing 31 provides a very slow correction due to its ratio which is about 10-1, when compared to the correction introduced by action of motor 7 on the elevator control system. While the pulley and belt coupling is shown for this purpose, any other form of coupling may be employed to transmit the action of motor 2 to the throttle controls.

Signals coming in from antenna 23 operate glide path receiver 4 and the resultant output is fed to relay 28 as well as modulator amplifier 6. If the aircraft is above or below the glide path, voltage will be applied to relay 28 from glide path receiver 4, causing contact arm of relay 28 to engage either contact 29 or contact 30 depending upon the direction of flow of current in the relay and according to the polarity of the output of receiver 4. Reversible motor 2 then moves to change the throttle setting and increase or decrease the rate of descent of the aircraft by connecting through gear train and pulleys 32, 34 and 35. This correction is slow and acts in conjunction with the pitch correction introduced through modulator amplifier 6, motor 7, gear train 25 and elevator control 26, as described more particularly hereinafter in connection with the modification of Fig 3. The reason for employing a very slow throttle correction instead of a very fast one, is to keep the airplane from hunting or flying back and forth across the glide path line, as might be the case where the correction was applied very rapidly.

Upon reaching the glide path line, the output of receiver 4 diminishes to such an extent that the winding of relay 28 becomes de-energized and contact arm thereof breaks contact with either contact 29 or contact 30, as the case may be, and opens the circuit to motor 2, bringing it to rest. At the same time, motor 7 has returned potentiometer 8 to a position where the bridge is rebalanced and climb gyro control is stationary. A balance between rate of descent and/or speed has been reached to enable the aircraft to proceed down the glide path line.

Figure 3:
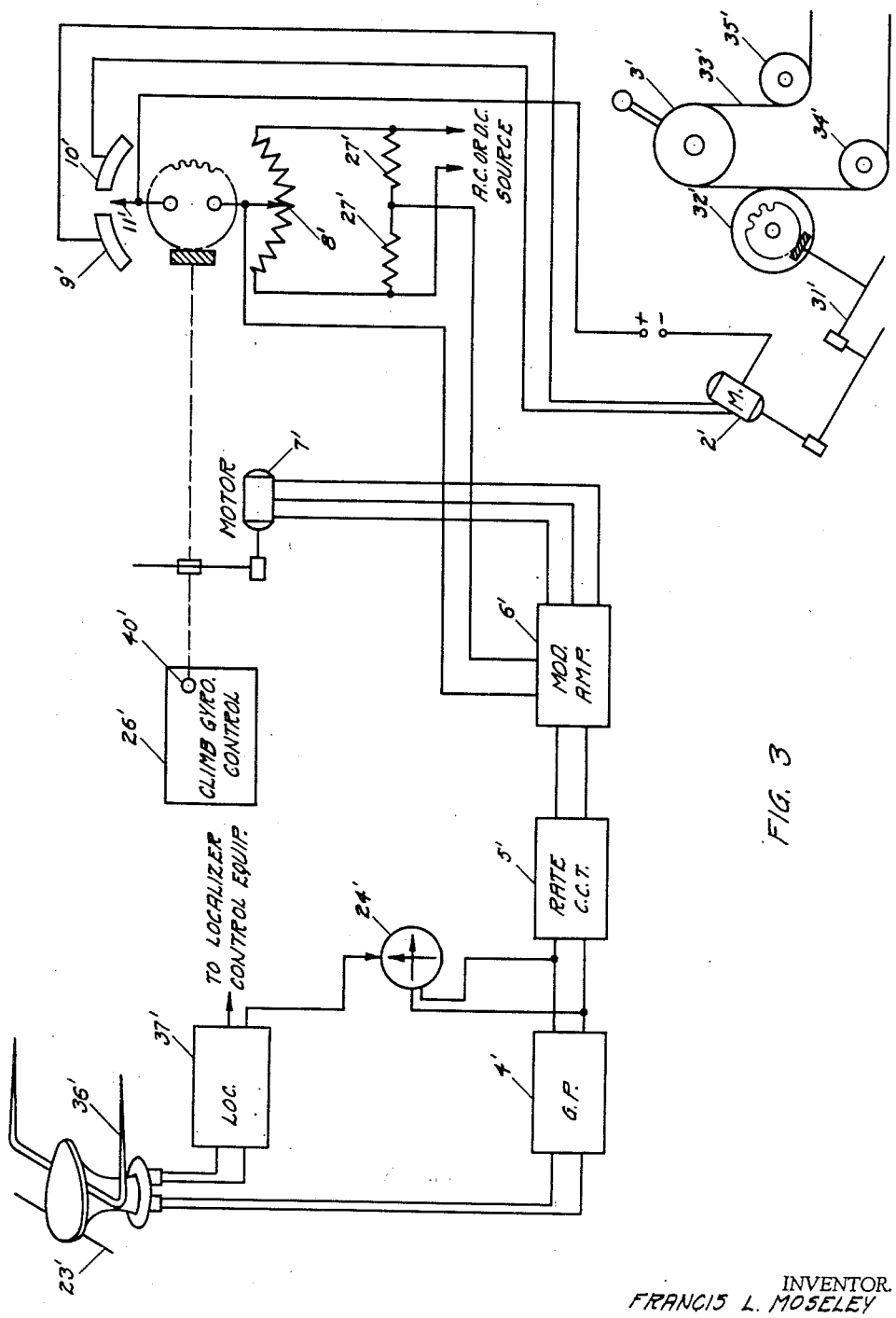
Fig. 3 is a schematic circuit diagram of another form of applicant's improved control circuit.

Another modification of the same system is disclosed in Fig. 3 with the antenna shown at 23', the glide path receiver at 4', and the cross-pointer instrument at 24'. The output of the glide path receiver 4' feeds into modulator amplifier 6' through rate circuit 5' and this, in turn, feeds reversible motor 7' for actuating the elevator control system of auto pilot through control 26' and knob or regulator 48'. It also changes the setting of follow-up potentiometer 8'. In connection with potentiometer 8' an auxiliary arm 11' is provided to be moved by the potentiometer shaft over the sectors 9', 10' along with the potentiometer arm. The sectors 9', 10' are attached to the frame of the potentiometer 8' or are mounted adjacent to it. The potentiometer 8', and resistor 27' together with the A. C. or D. C. source provides a bridge for furnishing a follow-up signal to modulator amplifier 6' in opposed relation to the output from glide path receiver 4'. The sectors 9', 10' are so positioned that when bridge 8', 27' is in balance and the contact arm of potentiometer 8' is in the center of the resistor, the auxiliary contact 11' will be positioned between sectors 9', 10' and out of electrical contact with them. Sectors 9', 10' and auxiliary arm 11' feed reversible motor 2' from any conventional source. The motor 2' actuates through gear train 31', throttle control mechanism 32', 33', 34', 35' and 3' similar to that previously described in connection with Fig. 2.

The foregoing takes account of the fact that potentiometer 8' is a power follow-up on the cross-pointer instrument 24'. The auxiliary contact arm 11' makes contact with sector 9' or sector 10' whenever potentiometer 8' is at a position other than balance but has no electrical connection with resistance element of potentiometer 8'. Motor 2' is rotated in either direction depending upon whether contact is made by auxiliary contact arm 11' with sector 9' or sector 10'. Motor 2' acts upon the throttle mechanism to increase or decrease the power delivered and, therefore, the movement of the aircraft towards or away from the glide path.

When the automatic flight control is brought into operation, and the aircraft is above or below the glide path line, the position signal from the glide path receiver 4' acting through modulator-amplifier 6' causes motor 7' to act through the elevator control mechanism and change the position of the elevators and the pitch of the aircraft, altering the potentiometer 8' and the bridge setting, and bringing the auxiliary arm 11' into contact with either sector 9' or sector 10', as previously explained. The motor 2' acting slowly through its gear train 31', alters the power setting through the throttle mechanism.

During this time the bridge circuit, through its unbalance, has delivered a follow-up signal to modulator amplifier 6' which has finally reached such a magnitude that it has cancelled out the positional signal from the glide path receiver 4' so that motor 7' stops. However, the gear of motor 2' in slowly changing the power of the aircraft, and therefore the air speed and rate of descent, continues but as the aircraft approaches the glide path the positional signal diminishes and the motor 7' moves in the opposite direction under the influence of the follow-up signal from the bridge circuit including potentiometer 8', returning the potentiometer arm towards the center position and operating the control 26' to alter the pitch of the aircraft. This process continues until the bridge is balanced again by arm of potentiometer 8' reaching center position and no follow-up signal is available. At this point, auxiliary arm 11' is also centered between sectors 9', 10', and motor 2' comes to rest. A complete condition of balance has been reached. The aircraft is on the glide path. Where winds are involved, pitches and rates of descent have been established through combined action of the elevators and throttle control which will cause the aircraft to fly in such a position and such speed as will maintain it on the glide path and cause it to proceed along the glide path to the runway for landing.

Although not shown in any of the figures, it may be desirable to have the aircraft fitted with an automatic trim tab control of some standard type. A trim tab control is a device which detects the fact that the control surfaces are loaded more in one direction than another, and that the airplane is being maintained in the desired attitude by the gyro pilot. The trim tab control then acts to slowly readjust the trim tab to equalize the load on the two sides of the airplane control surface. The use of such a device may be highly desirable during automatic approach as it would insure that upon manual disconnection of the automatic pilot the airplane would remain in its previous attitude instead of violently moving to a new attitude as soon as the automatic pilot had released the control surfaces, allowing them to swing to a balanced condition.

In Figs. 2 and 3 are identical antennas 36, 36' and localizer or radio range receivers 37, 37'. These form no part of the applicant's invention. However, details of their use and operation will be found in applicant's prior co-pending application cited above.

Figure 4:
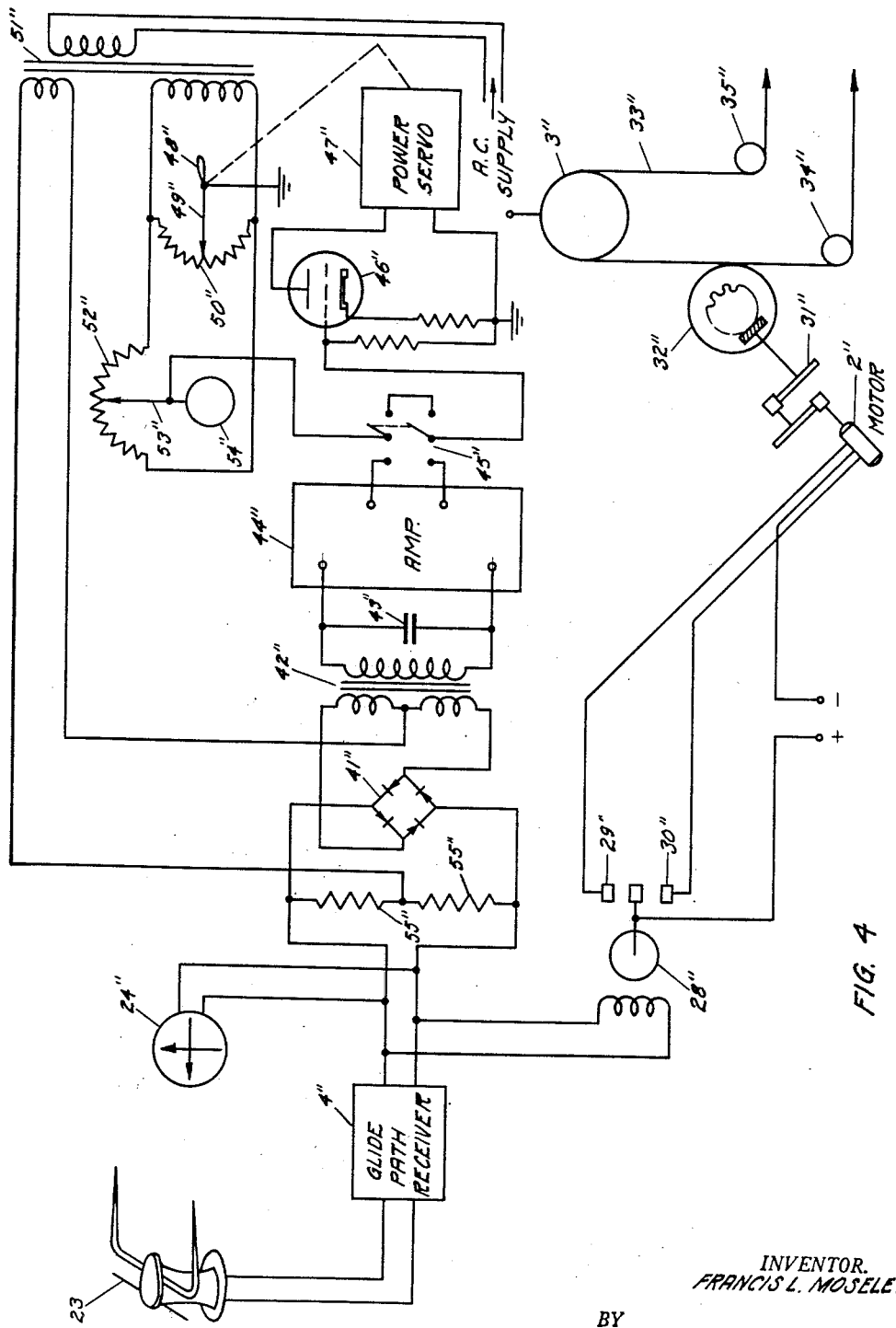
Fig. 4 shows a schematic circuit diagram of another of applicant's improved control circuits.

Referring to the modification of Fig. 4, a different form of elevator control is shown. The antenna 23", glide path receiver 4", and cross pointer instrument 24" are conventional and are the same as previously described. Polarized relay 28", reversible motor 2", gearing 31", throttle 3", pulleys 32", 35", 34", and control cord 33" are the same as set forth in Fig. 2, and operate in a similar manner.

The output of glide path receiver 4" feeds the outer terminals of center tapped resistor 55" and feeds on to opposed points on ring modulator 41". The other diagonally opposite points on ring modulator 41" are connected to outer terminals of the center tapped primary of transformer 42". A. C. is fed into this circuit from the secondary of transformer 51", preferably a part of the auto-pilot of the aircraft, thru the center tap of transformer 42" and resistance 55". Across the secondary of transformer 42" is provided a tuning condenser 43" to restore wave shape of the voltage passing thru the circuit, as same is distorted in ring modulator 41". The secondary of transformer 42" then feeds into a conventional amplifier 44" to raise the signal level before feeding it to control amplifier 46" and power servo 47" of conventional type. The power servo 47" serves to move the elevators 48" of the aircraft and moves a wiper or arm 49" of the potentiometer 50". This potentiometer 50" is in a bridge circuit with potentiometer 52" controlled by horizon gyro which moves arm 53" over it. The arm 53" is in turn connected thru conventional double pole double throw switch 45" to the output of amplifier 44".

In operation a positional signal from glide path receiver 4" in the form of D. C. whose strength and polarity are determined by the position of the aircraft with respect to a radio defined glide path, is impressed across the ring modulator 41". This upsets the normal balance of the modulator and permits more A. C. from transformer 51" to flow in one part of primary winding of transformer 42" than in the other part.

It will be understood that prior to this signal the ring modulator 41" is balanced so that A. C. from transformer 51" is equally divided in the two parts of resistor 55" and in transformer 42", flowing in opposite directions in the parts of the primary winding, effectively cancelling out, and producing little or no output in the secondary of transformer 42".

This unbalance due to the positional signal creates a voltage in the output of transformer 42" which is amplified at 44" and fed in opposition to the repeat back voltage from bridge 50", 52" to the input of amplifier 46", and on to power servo 47". The servo then moves the elevators 48" to such position as to cause the attitude of the aircraft to be changed, upsetting the balance of this bridge and causing a repeat back signal to be fed from the bridge including potentiometers 50", 52" and transformers 51" to amplifier 46" in opposition to the positional signal. When it reaches the strength of the positional signal the servo ceases to function. The elevators have thus moved to a position proportional to the distance of the aircraft from the glide path. However, when the aircraft swings into its new attitude, the horizon gyro 54" causes arm 53" to move to such a position on potentiometer 52" to further upset the bridge balance, increase the repeat back signal, and return the elevators to stream line position.

The throttle control including polarized relay 28" operates as previously described in connection with the other modifications. Since the potentiometer 50" is a power follow up on the cross pointer meter 24" it will be understood that an auxiliary arm and sectors like that shown at 9', 10', 11' of Fig. 3 may be employed in lieu of the polarized relay 28" to control the operation of reversible motor 2", and therefore the throttle setting of the engines.

Having thus described my invention, I claim:
1. A radio-controlled system for automatically guiding the vertical flight of an aircraft with re- spect to the ground and within a radio-defined region of the type having an equi-signal glide-path-defining line produced by a radio transmitter on the ground, and comprising in combination a radio receiver on the aircraft effective when said aircraft enters said region and responsive to the position of the aircraft above or below said line to produce corresponding positional signals of different magnitude and polarity, first electromagnetic means connected to said receiver and responsive to said signals to change the direction of the aircraft flight controls to head the aircraft towards said line, means to generate a follow-up signal to oppose said positional signal for causing said aircraft flight controls to return to their original setting at the time the aircraft entered said region, a speed control throttle on the aircraft and additional electromagnetic means automatically responsive to said signals for actuating the speed control throttle of the aircraft to control the aircraft's rate of descent or ascent necessary to bring it on to said line and to maintain it on said line substantially independent of head or tail winds acting on the aircraft.

2. A radio-controlled system for automatically guiding the vertical flight of an aircraft with respect to the ground within a radio-defined glide region of the type having a radio transmitter on the ground for setting up an equi-signal glide-path-defining line, comprising in combination a radio receiver on the aircraft effective when the aircraft enters said region to produce positional signals whose magnitude and polarity correspond respectively to the displacement of the aircraft from said line and the direction of vertical displacement of the aircraft with respect to said line, means responsive to said signals to change the setting of the directional flight controls of the aircraft to head the aircraft towards said line, means including a first motor to generate a follow-up signal to oppose said directional signal and cause the aircraft directional flight controls to return to their original setting at the time the aircraft entered said region, a speed control throttle on the aircraft and additional means including a second motor automatically responsive to the polarity of said signals for actuating said throttle of the aircraft to control its rate of descent or ascent necessary to bring it on to said line and to maintain it on said line, and means to cause said second motor to come to rest when the positional signal is balanced by the said follow-up signal.

3. An arrangement for automatically guiding the vertical flight of an aircraft with respect to the ground within a radio-defined glide region of the type having an equi-signal glide-path-defining line produced by radio transmission means on the ground, and comprising in combination on the aircraft a radio receiver for producing direct current polarized signals whose polarity and magnitude correspond respectively to the relative vertical displacement of the aircraft with respect to said line and the extent of said displacement, a first motor for automatically setting the aircraft elevators, a control circuit for said motor, means to feed said control circuit with the said signals, a local follow-up circuit having a follow-up element movable in unison with respect to said elevators, means to supply said follow-up circuit with a local current of predetermined fixed magnitude said circuit producing a follow-up current, means to apply said follow-up current to said control circuit to produce in conjunction with said signals a resultant current corresponding to the change in setting of said elevators required to bring the aircraft on to said line, means to apply said resultant current to said first motor, reversing switch means operated by said direct current polarized signals, a speed control throttle for the aircraft, a reversible motor for operating said throttle, and means to control the reversal of said second motor by said switch means to control the rate of descent or ascent of the aircraft necessary to bring it on to said line independently of head or tail winds acting on the aircraft.

4. An arrangement for automatically guiding the vertical flight of an aircraft with respect to the ground within a radio-defined glide region of the type having a glide-path-defining line produced by radio transmission means on the ground, and comprising on the aircraft a radio receiver for producing direct current polarized signals whose polarity and magnitude correspond respectively to the direction of vertical displacement of the aircraft with respect to said line and the extent of said displacement, a first motor for automatically setting the aircraft elevators, a control circuit for said motor, means to feed said control circuit with the said signals, a balancing bridge of the Wheatstone type having a pair of fixed ratio arms and a pair of adjustable ratio arms, said adjustable ratio arms being controlled by a movable follow-up member to produce a follow-up current when said bridge is unbalanced, means to supply a pair of conjugate points of said bridge with current of a uniform magnitude, means to connect the other pair of conjugate points of the bridge to said control circuit to produce a resultant motor control current, means to apply said motor control current to said first motor to operate said follow-up member until the bridge is balanced, a reversible throttle control motor for the aircraft, a pair of fixed contact segments connected to the motor windings, a contact for said segments and movable as a unit with said follow-up member to control the direction of rotation of said reversible motor for the purpose of controlling the rate of descent or ascent of the aircraft necessary to bring it on to said line.

5. An arrangement for automatically guiding the vertical flight of an aircraft with respect to the ground within a radio-defined glide region having a glide-path-defining line produced by radio transmission means on the ground, and comprising in combination on the aircraft a radio receiver for the reception of positional signals whose polarity and magnitude correspond respectively to the displacement of the aircraft from said line and to the vertical direction of such displacement, a balanced ring modulator, means to feed said modulator with said signals to control the modulator balance, a servo mechanism for actuating the aircraft elevators, means to connect said servo mechanism to said modulator to control said servo mechanism by said signals, a speed control throttle on the aircraft and separate electromagnetic means also simultaneously responsive to said signals for slowly and continuously changing said throttle of the aircraft to control its rate of descent or ascent necessary to bring it on to said line while compensating for the presence of either tail wind or head wind.

6. An arrangement for automatically guiding the vertical flight of an aircraft with respect to the ground within a radio-defined glide region of the type having a glide-path-defining line produced by radio transmission means on the ground and comprising in combination on the aircraft a radio receiver for producing direct current polarized signals whose polarity and magnitude correspond respectively to the direction of vertical displacement of the aircraft with respect to said line and to the extent of said displacement, motor-actuated means controlled by said signals for actuating the aircraft vertical flight control members to automatically head the aircraft towards said line regardless of the setting of said controls at the time the aircraft enters said region, a balancing bridge circuit actuated by said motor for supplying a follow-up signal to said motor-actuated means in opposed relation to said signals for restoring the aircraft flight controls to their original setting as the aircraft reaches said line, a speed control throttle on the aircraft and additional motor means controlled by said signals for adjusting said throttle on the aircraft to control its rate of descent or ascent necessary to bring it on to said line while compensating for the presence of either tail wind or head wind.

7. A radio-controlled glide path system for aircraft having forward power driving mechanism, comprising in combination a radio glide path receiver for producing glide path signals which are continuously variable as the aircraft departs from a predetermined radio-defined glide path line in space, a vertical pitch control device on the aircraft responsive to said signals, means to produce another electric signal proportional to the change of pitch of the aircraft, means to balance said signals to produce a resultant signal said balancing means including a bridge having a bridge adjusting member which is moved in timed relation with and in proportion to the extent to which said pitch is varied until both said signals are of equal magnitude, means to apply said resultant signal to continuously control said device until the aircraft reaches said glide path line, separate means to derive from said glide path signals another signal representing whether the aircraft is above or below said line, and another device for automatically controlling said forward power drive mechanism to change the ratio of forward speed with respect to the rate of ascent or descent of the aircraft and thereby to compensate for the presence of a tail or head wind acting on the aircraft.

8. A system according to claim 7, in which said vertical pitch control device and also the last-mentioned means have motor means for driving the first-mentioned device at a faster rate than that of said other device.

9. A system according to claim 8, in which said motor means comprises a first motor for operating the pitch control device, and a separate motor for operating said other device both of said motors being automatically controlled by said signals.

10. A system according to claim 9, in which said first motor operates a rotatable member which carries said bridge adjusting member, a reversing circuit for controlling the direction of rotation of said second motor, and switch-reversing means for controlling said reversing circuit and operated in unison with said bridge adjusting member.

11. A radio glide path system for aircraft and the like, comprising in combination, means to set up a radio field pattern defining a predetermined glide path line, a radio receiver controlled by said field pattern for producing electric signals correlated with the departure of the craft from said line, a control device on the craft for controlling the vertical pitch of the craft with respect to said line, electric circuits for applying said signals to operate said control device and including electromechanical means for continuously reducing said departure even when the initial vertical pitch of the aircraft with respect to said line is away from said line at the time the craft enters said field pattern, means continuously effective during the reduction of said departure for modifying the effect of said signals on said control device in accordance with the rate of said departure reduction, a throttle control device, motor mechanism for controlling said device, and additional means for automatically controlling said motor means in accordance with said signals.

12. A radio control system for automatically directing an aircraft along a predetermined glide path line in space defined by directively radiated electromagnetic wave energy, comprising in combination automatic pilot means for stabilizing an axis of said aircraft at an adjustable angle of vertical pitch, radio receiver means responsive to the intensity of said radiated energy at the location of the aircraft to derive a signal having an amplitude representative of the extent of displacement of the aircraft above or below said line, aircraft vertical pitch control means, means to continuously operate said pitch control means under control of said signals until the aircraft reaches said line, a power throttle for controlling the forward driving power of the aircraft, and separate means effective when the aircraft is above said line to operate said throttle under control of said signals for automatically increasing the ratio of forward speed to rate of descent in the presence of a head wind, and for automatically decreasing the ratio of forward speed to descent in the presence of a tail wind.

13. A radio glide path system according to claim 12, in which the last-mentioned means includes an element for rendering said automatic throttle control means ineffective when the aircraft is following the said glide path line.

14. A radio controlled system for automatically guiding the vertical flight of an aircraft with respect to the ground and within a radio-defined region of the kind having an equi-signal glide-path-defining line produced by a radio transmitter on the ground, and comprising in combination a vertical pitch control device and a forward speed throttle control device on said aircraft, a radio receiver on the aircraft which is responsive to the aircraft entering said region to produce positional control electric signal components proportionately respectively to the vertical displacement of the aircraft above or below said line, first electromagnetic motor means responsive to said signal components to correspondingly control said vertical pitch control device, and additional electromagnetic motor means also simultaneously automatically responsive to said signal components for automatically controlling said throttle control device and thereby modifying the action of the first motor means to bring said aircraft on to said line and to maintain it on said line substantially independently of head winds or tail winds acting on the aircraft.

15. A radio-controlled system for automatically guiding the vertical flight of an aircraft with respect to the ground and within a radio-defined region of the type having an equi-signal glide-path-defining line produced by a radio transmitter on the ground, and comprising in combination a radio receiver on the aircraft effective when said aircraft enters said region and responsive to the position of the aircraft above or below said line to produce corresponding positional signals of different magnitude and polarity, first electromagnetic means connected to said receiver and responsive to said signals to change the direction of the aircraft flight controls to head the aircraft towards said line, means to generate a follow-up signal to oppose said positional signal for causing said aircraft flight controls to return to their original setting at the time the aircraft entered said region, a speed control throttle on the aircraft, and additional electromagnetic means automatically responsive to said signals for actuating the speed control throttle of the aircraft to control the aircraft's rate of descent or ascent necessary to bring it on to said line and to maintain it on said line substantially independent of head or tail winds acting on the aircraft, said receiver being connected to a modulator-amplifier which is jointly controlled by said positional signals and by said follow-up signals, and said additional means comprises a throttle operating motor whose direction of rotation is controlled by the polarity of said positional signals.

16. A radio-controlled system for automatically guiding the vertical flight of an aircraft with respect to the ground and within a radio-defined region of the type having an equi-signal glide-path-defining line produced by a radio transmitter on the ground, and comprising in combination a radio receiver on the aircraft effective when said aircraft enters said region and responsive to the position of the aircraft above or below said line to produce corresponding positional signals of different magnitude and polarity, first electromagnetic means connected to said receiver and responsive to said signals to change the direction of the aircraft flight controls to head the aircraft towards said line, means to generate a follow-up signal to oppose said positional signal for causing said aircraft flight controls to return to their original setting at the time the aircraft entered said region, a speed control throttle on the aircraft, and additional electromagnetic means automatically responsive to said signals for actuating the speed control throttle of the aircraft to control the aircraft's rate of descent or ascent necessary to bring it on to said line and to maintain it on said line substantially independent of head or tail winds acting on the aircraft, said additional means including a throttle operating motor which responds to said positional signals, and speed reduction means between said throttle operating motor and the throttle to operate the throttle continuously but at a slower rate than the rate of changing of said directional controls.

17. A radio-controlled system for automatically guiding the vertical flight of an aircraft with respect to the ground within a radio-defined glide region of the type having a radio transmitter on the ground for setting up an equi-signal glide-path-defining line, comprising in combination a radio receiver on the aircraft effective when the aircraft enters said region to produce positional signals whose magnitude and polarity correspond respectively to the displacement of the aircraft from said line and the direction of vertical displacement of the aircraft with respect to said line, means responsive to said signals to change the setting of the directional flight controls of the aircraft to head the aircraft towards said line, means including a first motor to generate a follow-up signal to oppose said directional signal and cause the aircraft directional flight controls to return to their original setting at the time the aircraft entered said region, a speed control throttle on the aircraft, and additional means including a second motor automatically responsive to the polarity of said signals for actuating said throttle of the aircraft to control its rate of descent or ascent necessary to bring it on to said line and to maintain it on said line, and means to cause said second motor to come to rest when the positional signal is balanced by the said follow-up signal, said first motor being controlled by a balancing follow-up circuit fed simultaneously by said positional signals and by other signals determined by the extent of departure in the setting of the aircraft directional flight controls from that necessary to head the aircraft to said line, and said second motor is connected to a reversing switch device which is controlled by said positional signals.

18. A radio control system according to claim 17 in which said balancing follow-up circuit comprises a balancing bridge having an adjustable bridge-balancing member which is operated by said first motor.

19. An arrangement for automatically guiding the vertical flight of an aircraft with respect to the ground within a radio-defined glide region of the type having a glide-path-defining line produced by radio transmission means on the ground and comprising in combination on the aircraft a radio receiver for producing direct current polarized signals whose polarity and magnitude correspond respectively to the direction of vertical displacement of the aircraft with respect to said line and to the extent of said displacement, motor-actuated means controlled by said signals for actuating the aircraft vertical flight control members to automatically head the aircraft towards said line regardless of the setting of said controls at the time the aircraft enters said region, a balancing bridge circuit actuated by said motor for supplying a follow-up signal to said motor-actuated means in opposed relation to said signals for restoring the aircraft flight controls to their original setting as the aircraft reaches said line, a speed control throttle on the aircraft, and additional motor means controlled by said signals for adjusting said throttle on the aircraft to control its rate of descent or ascent necessary to bring it on to said line while compensating for the presence of either tail wind or head wind, said additional means including a second motor which is connected to the throttle actuating mechanism of the aircraft through a speed reduction gear train for slowly and continuously altering the throttle setting as the aircraft approaches said line.

FRANCIS L. MOSELEY.

References Cited in the file of this patent

UNITED STATES PATENTS

| Number | Name | Date |
| --- | --- | --- |
| 1,958,259 | Becker | May 8, 1934 |
| 2,133,285 | Dunmore | Oct. 18, 1938 |
| 2,159,142 | Fischer | May 23, 1939 |
| 2,253,508 | Crane et al. | Aug. 26, 1941 |
| 2,264,056 | Thacker et al. | Nov. 25, 1941 |
| 2,321,582 | Crane et al. | June 15, 1943 |
| 2,322,225 | Crane et al. | June 27, 1943 |
| 2,423,336 | Moseley | July 1, 1947 |
| 2,423,337 | Moseley | July 1, 1947 |